(12) United States Patent
Fischer

(10) Patent No.: US 9,686,049 B2
(45) Date of Patent: Jun. 20, 2017

(54) METHOD AND SYSTEM FOR BLUETOOTH (BT) DELAYED ACKNOWLEDGEMENT (ACK)

(75) Inventor: Matthew J. Fischer, Mountain View, CA (US)

(73) Assignee: Avago Technologies General IP (Singapore) Pte. Ltd, Singapore (SG)

( * ) Notice: Subject to any disclaimer, the term of this patent is extended or adjusted under 35 U.S.C. 154(b) by 571 days.

(21) Appl. No.: 12/192,568

(22) Filed: Aug. 15, 2008

(65) Prior Publication Data

US 2009/0067396 A1    Mar. 12, 2009

Related U.S. Application Data

(60) Provisional application No. 60/971,661, filed on Sep. 12, 2007, provisional application No. 61/073,855, filed on Jun. 19, 2008.

(51) Int. Cl.
*H04L 1/18* (2006.01)
*H04W 88/06* (2009.01)
(Continued)

(52) U.S. Cl.
CPC ............ *H04L 1/188* (2013.01); *H04L 1/1854* (2013.01); *H04W 84/12* (2013.01); *H04W 84/18* (2013.01); *H04W 88/06* (2013.01)

(58) Field of Classification Search
None
See application file for complete search history.

(56) References Cited

U.S. PATENT DOCUMENTS 6,560,443 B1 *  5/2003  Vaisanen et al. ............... 455/73
7,372,833 B2 *  5/2008  Kyronaho ............... H04L 12/14
                                                      370/331

(Continued)

OTHER PUBLICATIONS

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, IEEE Std. 802.11—2007, IEEE, Jun. 12, 2007, pp. 60-70, 75-77, 79-80, 87, 93-97, 149-151, 302-306, 450-455, and 490-493.

(Continued)

*Primary Examiner* — Alpus H Hsu
*Assistant Examiner* — Hooman Houshmand
(74) *Attorney, Agent, or Firm* — Garlick & Markison; Randy W. Lacasse

(57) ABSTRACT

A method and system for Bluetooth (BT) delayed acknowledgment is presented. Aspects of the system may include an initiator device, such as a WLAN access point (AP), which enables transmission of a protocol data unit, such as a BlockAckReq frame, to a responder device, such as a Smartphone, via a first network, for example a WLAN. The Smartphone may be equipped with capabilities that enable communication via WLAN and Bluetooth networks. The AP may wait to receive a response protocol data unit, such as a BlockAck frame, via the first network (WLAN) for a response time duration. The response time duration may be based on the communication slot time duration for communication by the Smartphone on a second network, for example a BT piconet. The communication slot time duration may correspond to the time duration for a BT slot.

16 Claims, 10 Drawing Sheets

(51) Int. Cl.
*H04W 84/18* (2009.01)
*H04W 84/12* (2009.01)

(56) References Cited

U.S. PATENT DOCUMENTS

| | | | | |
|---|---|---|---|---|
| 7,389,352 | B2* | 6/2008 | Cromer et al. | 709/227 |
| 7,474,676 | B2* | 1/2009 | Tao et al. | 370/469 |
| 7,656,892 | B2* | 2/2010 | Barak et al. | 370/462 |
| 7,716,379 | B2* | 5/2010 | Ruan et al. | 709/250 |
| 7,734,253 | B2* | 6/2010 | Chen et al. | 455/41.2 |
| 7,734,292 | B2* | 6/2010 | Cho et al. | 455/436 |
| 7,852,791 | B2* | 12/2010 | Nakajima et al. | 370/282 |
| 7,944,819 | B2* | 5/2011 | Ho | 370/229 |
| 2002/0021746 | A1* | 2/2002 | Schmidl et al. | 375/132 |
| 2002/0105931 | A1* | 8/2002 | Heinonen et al. | 370/338 |
| 2004/0068571 | A1* | 4/2004 | Ahmavaara | 709/228 |
| 2004/0116075 | A1* | 6/2004 | Shoemake et al. | 455/41.2 |
| 2004/0152417 | A1* | 8/2004 | Kim et al. | 455/41.2 |
| 2006/0030266 | A1* | 2/2006 | Desai et al. | 455/41.2 |
| 2006/0034247 | A1* | 2/2006 | Gu et al. | 370/349 |
| 2006/0034274 | A1* | 2/2006 | Kakani et al. | 370/389 |
| 2006/0056443 | A1* | 3/2006 | Tao et al. | 370/462 |
| 2006/0062235 | A1* | 3/2006 | Ginzburg | 370/431 |
| 2006/0084383 | A1* | 4/2006 | Ibrahim et al. | 455/41.2 |
| 2006/0239213 | A1* | 10/2006 | Frederiks et al. | 370/278 |
| 2007/0110055 | A1* | 5/2007 | Fischer et al. | 370/389 |
| 2007/0147332 | A1* | 6/2007 | Lappetelainen | H04W 74/06 370/346 |
| 2007/0162813 | A1* | 7/2007 | Nakashima | 714/749 |
| 2008/0002615 | A1* | 1/2008 | Nakajima et al. | 370/328 |
| 2008/0013659 | A1* | 1/2008 | Kim | 375/354 |
| 2008/0112345 | A1* | 5/2008 | Sivakumar et al. | 370/310 |
| 2008/0212612 | A1* | 9/2008 | Singh et al. | 370/474 |
| 2009/0303906 | A1* | 12/2009 | Zechlin et al. | 370/280 |
| 2009/0318087 | A1* | 12/2009 | Mattila | H04B 1/109 455/63.1 |
| 2010/0080205 | A1* | 4/2010 | Hirsch et al. | 370/338 |
| 2010/0284380 | A1* | 11/2010 | Banerjee et al. | 370/338 |
| 2011/0064065 | A1* | 3/2011 | Nakajima et al. | 370/338 |

OTHER PUBLICATIONS

IEEE P802.11/D3.03, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment 4: Enhancements for Higher Throughput, IEEE Standards Activities Department, Feb. 2008, pp. 25-31, 42-43, 67-70, 93-99, 128, 134-144, and 222.

* cited by examiner

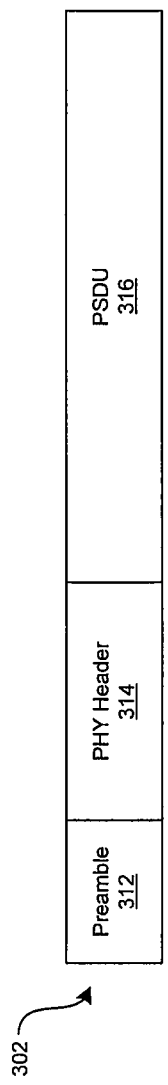
FIG. 3A
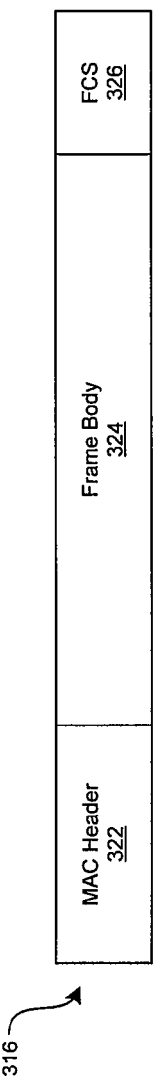
FIG. 3B
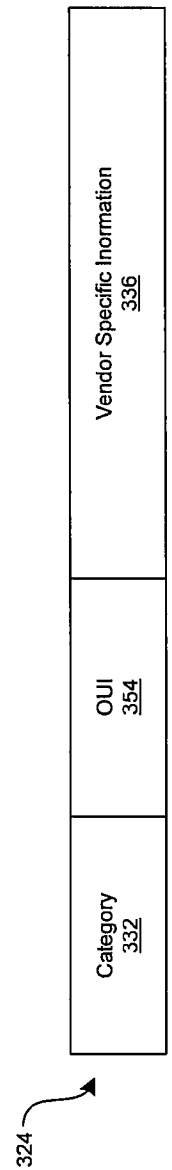
FIG. 3C
FIG. 3

METHOD AND SYSTEM FOR BLUETOOTH (BT) DELAYED ACKNOWLEDGEMENT (ACK)

CROSS-REFERENCE TO RELATED APPLICATIONS/INCORPORATION BY REFERENCE

This application makes reference to, claims priority to, and claims the benefit of U.S. Provisional Application Ser. No. 60/971,661 filed Sep. 12, 2007 and U.S. Provisional Application Ser. No. 61/073,855 filed Jun. 19, 2008, which is hereby incorporated herein by reference in its entirety.

FIELD OF THE INVENTION

Certain embodiments of the invention relate to communication networks. More specifically, certain embodiments of the invention relate to a method and system for Bluetooth (BT) delayed acknowledgment (ACK).

BACKGROUND OF THE INVENTION

IEEE 802.11 describes a communication architecture, which may enable computing devices to communicate via wireless local area networks (WLANs). One of the building blocks for the WLAN is the basic service set (BSS). A BSS may comprise a plurality of computing devices, or stations (STA), which may communicate wirelessly via one or more RF channels within an RF coverage area. The span of an RF coverage area may be determined based on the distance over which a source STA may transmit data via an RF channel, which may be received by a destination STA.

An independent BSS (IBSS) refers to a BSS, which comprises a set of STAs, which may communicate with each other within the RF coverage area for the BSS. The IBSS is identified by a BSS identifier (BSSID) and a service set identifier (SSID). In an IBSS each STA may engage in direct communication with any of the other STAs within the IBSS. An IBSS may be referred to as an ad hoc network.

An infrastructure BSS refers to a BSS, which may be associated with an extended service set (ESS). The ESS is identified by a service set identifier (SSID). An infrastructure BSS may also be referred to as a BSS. Each of the BSSs within an ESS is identified by a BSS identifier (BSSID). Thus, STAs within a BSS generally determine their association within the BSS based on a BSSID and an SSID.

Each BSS comprises a plurality of STAs and an AP. The AP forms an association with each of the STAs within the BSS. The AP identifies each association by an association identifier (AID). The AP may provide communication services to STAs within a BSS based on the presence of an established association.

Bluetooth (BT) is a short range wireless communications capability that enables wireless communication between consumer and computer equipment. Equipment that is enabled to utilize Bluetooth technology may be referred to as Bluetooth devices (DEVs). Bluetooth is designed to enable a plurality of Bluetooth devices to operate in a personal area network (PAN) environment. The plurality of Bluetooth devices in a PAN environment may comprise a network known as a piconet. One of the DEVs in a piconet may function as a piconet coordinator (or controller), or PNC. The PNC may provide overall coordination for the communication between DEVs in a piconet.

Examples of Bluetooth devices are personal digital assistants (PDA), wireless headsets, telephones, home audio equipment, and computers. Bluetooth technology may be utilized as a replacement for cables that link computers to printers, keyboards, and mouse devices. Bluetooth technology may also be utilized to enable users to engage in telephone communication by using a wireless headset connected via wireless link to a wired or wireless telephone unit. Bluetooth technology may be utilized to allow a user to enable an MP3 player to wirelessly receive or transmit digital audio data from or to a home audiovisual system with no wired connection between the MP3 player and the home audiovisual system. The user may then play the digital audio on the MP3 player or on the home audiovisual system.

WLAN BSSes and Bluetooth PANs may coexist in the same vicinity. In addition, WLAN STA capability and Bluetooth device capability may coexist within the same physical device, for example a computer may be equipped to communicate in WLAN and/or PAN environments. A device with dual WLAN and Bluetooth capability may be unable to communicate via the WLAN environment while communicating via the PAN environment, or vice versa.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for Bluetooth (BT) delayed acknowledgment (ACK), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3A is an illustration of an exemplary management frame supporting BTDA, in accordance with an embodiment of the invention.

FIG. 3B is an illustration of an exemplary management frame payload supporting BTDA, in accordance with an embodiment of the invention.

FIG. 3C is an illustration of an exemplary management frame body supporting BTDA, in accordance with an embodiment of the invention.

DETAILED DESCRIPTION OF THE INVENTION

Certain embodiments of the invention may be found in a method and system for Bluetooth (BT) delayed acknowledgment (ACK). In various embodiments of the invention, WLAN station (STA) devices may communicate in initiator and responder roles, respectively. The responder device may comprise dual WLAN and BT capabilities, which enable communication via the WLAN and via the BT network. However, the responder device may not be able to communicate via the WLAN while engaged in communication via the BT network and vice versa. The initiator and responder devices may negotiate to enable a Bluetooth delayed acknowledgment (BTDA) capability, which enables the initiator device to learn of the dual network communication capabilities of the responder device. Under the negotiated BTDA capability, the initiator device may transmit a plurality of sequence-numbered protocol data units (PDUs) to the responder device. The plurality of transmitted frames transmitted by the initiator device may be referred to as a "block transfer". The initiator device may send a request for the responder device to respond by sending an acknowledgment of receipt of the block transfer. Under the negotiated BTDA capability, the amount of time for which the initiator device may wait to receive the acknowledgment from the responder device is determined based on the length of a time slot during which the responder device would communicate via the BT network. During this wait time, the initiator device may communicate with other WLAN STAs.

In another aspect of the invention, the initiator device may send a request to initiate a block transfer to the responder device. If the initiator device does not receive a response to the block transfer initiation request, the initiator device may send a subsequent block transfer initiation request to the responder device. Under the negotiated BTDA capability, the amount of time that the initiator device may wait before sending the subsequent block transfer initiation request may be determined based on the length of the time slot during which the responder device would communicate via the BT network. During this wait time, the initiator device may communicate with other WLAN STAs.

In an exemplary embodiment of the invention, the initiator device and responder device may transmit and/or receive PDUs referred to as "frames", which represents a PDU transmitted between devices in a WLAN. Alternatively, the PDUs may be referred to as "packets" without limiting the scope of understood meanings for the term "PDU" in various embodiments of the invention.

Figure 1:
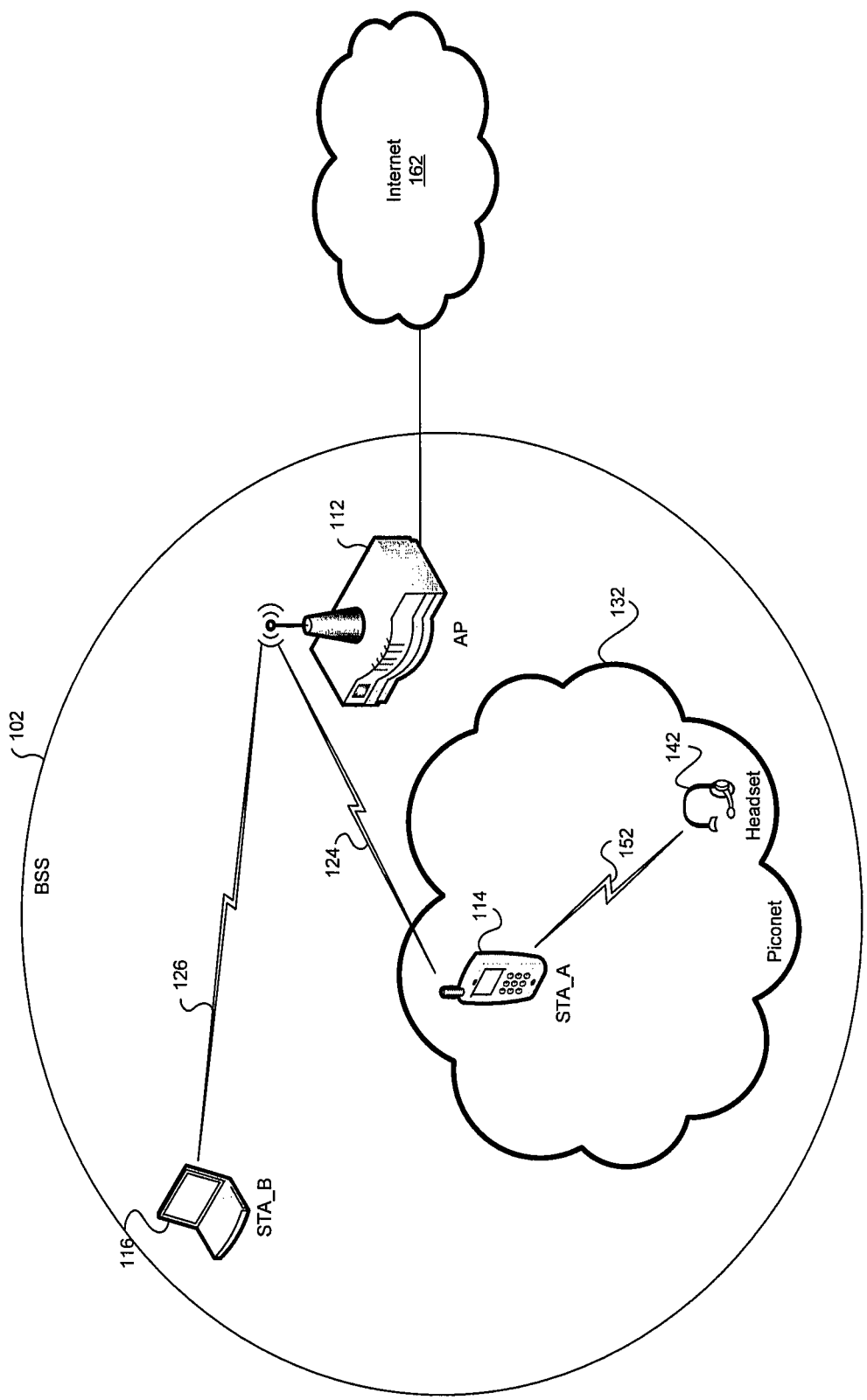
FIG. 1 is a block diagram of an exemplary system for wireless data communication, which may be utilized in an embodiment of the invention.

FIG. 1 is a block diagram of an exemplary system for wireless data communication, which may be utilized in an embodiment of the invention. Referring to FIG. 1, there is shown an exemplary WLAN BSS 102, an exemplary Bluetooth piconet 132 and an Internet 162. The BSS 102 and the piconet 132 shown in FIG. 1 are collocated in the sense that the span of the RF coverage area for the BSS 102 overlaps the RF coverage area for the piconet 132. The Internet 162 is representative of any suitable network, which enables communication with STAs within the BSS 102. The Internet 162 may utilize wired or wireless communication technology.

The BSS 102 comprises a WLAN access point AP 112, a STA_A 114 and a STA_B 116. The STA_A 114 may communicate within the BSS 102 and/or within the piconet 132. The STA_A 114 shown in FIG. 1 is a Smartphone. The STA_A 114 may communicate with the AP 112 via the RF channel 124 and the STA_B 116 may communicate with the AP 112 via the RF channel 126. The AP 112 enables the STA_A 114 and the STA_B 116 to communicate within the BSS 102. The AP 112 also enables the STA_A 114 and the STA_B 116 to communicate with devices that are communicatively coupled to the Internet 162. The piconet 132 comprises the STA_A 114 and a wireless headset 142. The STA_A 114 may also be the piconet coordinator (PNC) within the piconet 132. The STA_A 114 may communicate with the wireless headset 142 via the RF channel 152.

The STA_A 114 shown in FIG. 1 includes STA functionality for communicating within the WLAN 102 and Bluetooth device (DEV) functionality for communicating within the piconet 132. The STA_A 114, for example, may communicate with the wireless headset 142 within the piconet 132 to enable a user to utilize the wireless headset 142 to establish voice over Internet (VoIP) communications via the BSS 102 and/or via the BSS 102 and the Internet 162. The STA_A 114 may also enable the user to communicate data via the BSS 102 and/or via the BSS 102 and the Internet 162. The STA_A 114 may also communicate with the wireless headset 142 within the piconet 132 to enable a user to utilize the wireless headset 142 to establish voice and/or data communications via a cellular communication network (not shown).

In conventional WLAN communications, the AP 112 may act in the role of an initiator to send a single frame to the STA_A 114. At the time of frame transmission, the AP 112 may enable frames to be transmitted via RF channel 124 at a given data rate. After sending the frame, the AP 112 may wait for a determined period of time to receive an acknowledgment (ACK) from the STA_A 114, which acts in the role of responder. If the AP 112 does not receive an ACK by the end of the wait time period, the AP 112 may determine that the frame transmission failed. The AP 112 may respond by following a backoff procedure in which the AP 112 may alter the data rate for frame transmission via the RF channel 124 and determine a time instant for subsequent retransmission of the frame.

Conventional WLAN communications also enable the block transfer of frames from the AP 112 to the STA_A 114. In this case, the AP 112 may send a plurality of frames to the STA_A 114, after which the AP 112 may send a block acknowledgment request (BlockAckReq) frame to the STA_A 114. After sending the BlockAckReq frame, the AP 112 may wait for a determined period of time to receive an ACK or block ACK (BlockAck) from the STA_A 114. In instances when the AP 112 does not receive an ACK or BlockAck by the end of the wait time period, the AP 112 may follow the backoff procedure and subsequently repeat the block transfer at a lower data rate. In other instances, the explicit transmission of a BlockAckReq frame is not required, for example, when the plurality of frames is sent within an aggregated MAC layer protocol data unit (A-MPDU) is transmitted. An A-MPDU comprises a plurality of MAC layer protocol data units (MPDUs). The A-MPDU is passed from a MAC layer protocol entity to a physical layer (PHY) protocol entity. Within the PHY layer entity, the A-MPDU is referred to as a PHY layer convergence procedure (PLCP) service data unit (PSDU). The A-MPDU may be transmitted within a PLCP protocol data unit (PDU) by a STA or AP via an RF channel, such as RF channels 124 and 126.

Communications between DEVs within a piconet may occur at designated time intervals referred to as Bluetooth (BT) slots. Within a given BT slot, a DEV may act in the role of an initiator to transmit frames to other DEVs within the piconet. When a device, for example STA_A 114 (FIG. 1), has dual WLAN STA and BT DEV capabilities, there may be instances when the STA_A 114 receives a BlockAckReq from an initiator device, for example the AP 112, via the BSS while the STA_A 114 is transmitting frames via the piconet during a BT slot. If STA_A 114 responds to the BlockAck-Req by transmitting a BlockAck during the BT slot, STA_A 114 transmission on the piconet may be interrupted and a communication failure may occur in the piconet. If the STA_A 114 continues communication within the piconet, the AP 112 transmitting device may detect a communication failure in the BSS and follow a backoff procedure. Detection of a communication failure in the piconet may negatively impact the communication performance in the piconet while detection of a communication failure on the BSS may negatively impact communication performance in the BSS.

In various embodiments of the invention, a device with dual WLAN STA and BT DEV capabilities, such as STA_A 114, may negotiate a BTDA capability with other devices in the BSS, such as AP 112, such that the AP 112 (acting as an initiator) may transmit a BlockAckReq frame to the STA_A 114 and wait for an extended period of time to receive an ACK or Block from the STA_A 114 (acting as a responder) before the AP 112 determines that a communication failure has occurred in the BSS. The extended period of time may be based on the time duration of a BT slot time interval. The STA_A 114, which receives a BlockAckReq frame during a BT slot, may transmit an ACK or BlockAck frame to the AP 112 at a time instant subsequent to the end of the BT slot.

Figure 2:
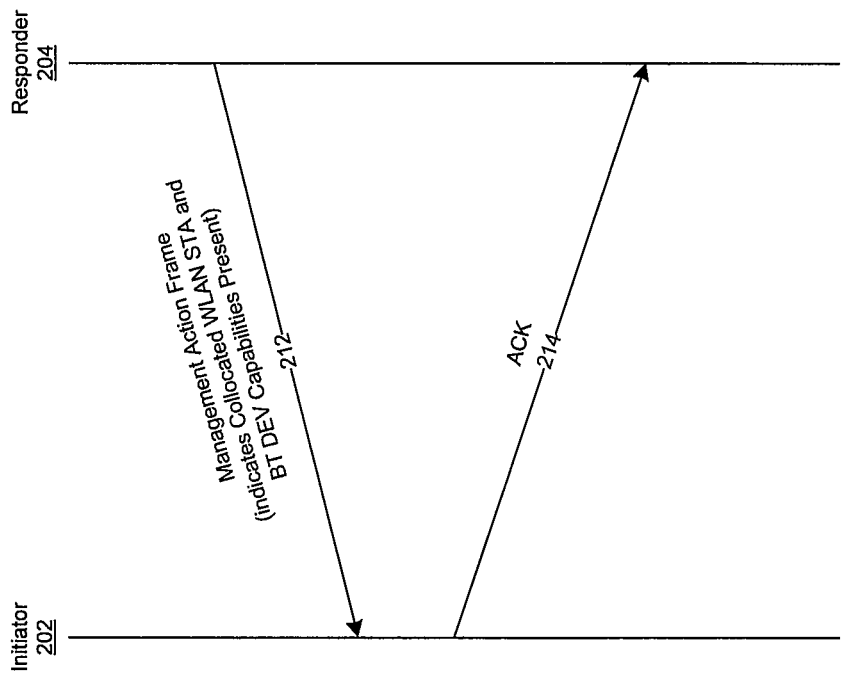
FIG. 2 is a flowchart illustrating exemplary message exchange flows to enable BTDA, in accordance with an embodiment of the invention.

FIG. 2 is a flowchart illustrating exemplary message exchange flows to enable BTDA, in accordance with an embodiment of the invention. In FIG. 2, the responder device 204 informs the initiator device 202 that the responder device 204 has dual WLAN STA and BT DEV capabilities. In this regard, the responder device 204 sends a frame, for example a management action frame 212, which indicates that dual WLAN STA and BT DEV capabilities are present in the responder device 204. The initiator device 202 acknowledges receipt of the management action frame 212 by sending an ACK frame 214 to the responder.

The message exchange shown in FIG. 2 enables the initiator device 202 to determine that BTDA may be utilized when communicating with the responder device 204 via a BSS. In general, the message exchanges depicted in FIG. 2 may not be limited to communication of dual (or collocated) WLAN STA and BT DEV capabilities but instead indicate that various embodiments of the invention may be practiced where a responder device communicates the ability to communicate via a plurality of distinct networks to an initiator device.

FIG. 3A is an illustration of an exemplary management frame supporting BTDA, in accordance with an embodiment of the invention. Referring to FIG. 3A, there is shown a physical (PHY) layer convergence procedure PDU (PPDU) 302. The PPDU may also be referred to as a frame. The frame 302 comprises a preamble field 312, a PHY header field 314 and a PHY layer convergence procedure (PLCP) service data unit (PSDU) 316. The PSDU may also be referred to as a payload.

The preamble field 312 is also referred to as a PLCP preamble field. The preamble enables the receiver of the frame 302 to establish synchronization and timing relationships, which enable the reception of the frame 302. The PHY header 314 is also referred to as a PLCP header field. The PHY header 314 enables the receiver of the frame 302 to determine the length of (measured in octets, for example), and start point for the PSDU 316 within the frame 302.

In various embodiments of the invention, a responder device 204 may transmit a frame 302, wherein the payload 316 comprises vendor specific information, which enables an initiator device 202 to determine that the responder device 204 has dual WLAN STA and BT DEV capabilities.

FIG. 3B is an illustration of an exemplary management frame payload supporting BTDA, in accordance with an embodiment of the invention. Referring to FIG. 3B, there is shown additional detail for the payload field 316 (FIG. 3A). The payload field 316 comprises a medium access control layer (MAC) header field 322, a frame body field 324 and a frame check sequence (FCS) field 326. The MAC header field 322 enables the responder device 204 to determine that the frame 302 is a management action frame. The FCS field 326 enables a responder device 204, which receives the frame 302, to detect bit errors in the received frame 302.

In various embodiments of the invention, a responder device 204 may transmit a frame 302, wherein the frame body field 324 comprises the vendor specific information.

FIG. 3C is an illustration of an exemplary management frame body supporting BTDA, in accordance with an embodiment of the invention. Referring to FIG. 3C, there is shown additional detail for the frame body field 324. The frame body field 324 comprises a category field 322, an organizationally unique identifier (OUI) field 354 and a vendor specific information field 336. The category field 322 enables the responder device 204 to determine that the received frame 302 comprises vendor specific information. The vendor specific information comprises an OUI field 354 and a vendor specific information field 336.

In various embodiments of the invention, the OUI field 354 may enable the responder device 204 to determine the format and contents of the vendor specific information field 336. In an exemplary embodiment of the invention, the vendor specific information field 336 comprises at least one bit, which, when set to a value of "1", enables the initiator device 202 to determine that the responder device 204, which sent the frame 302, has dual WLAN STA and BT DEV capabilities. The location(s) of the one or more bits within the vendor specific information field 336 may be determined based on the contents of the OUI field 354.

Figure 4:
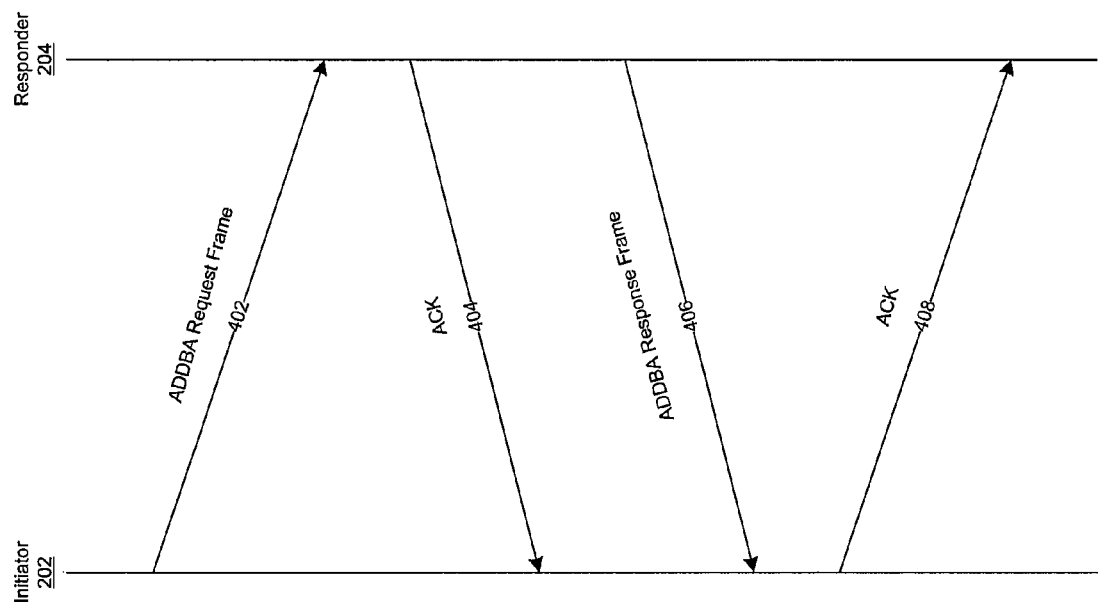
FIG. 4 is a flowchart illustrating exemplary message exchange flows for block acknowledgment establishment, in accordance with an embodiment of the invention.

FIG. 4 is a flowchart illustrating exemplary message exchange flows for block acknowledgment establishment, in accordance with an embodiment of the invention. The flowchart of FIG. 2 shows message exchanges, which may enable a responder device 204 to indicate dual WLAN STA and BT DEV functionality to an initiator device 202 in a WLAN. The flowchart of FIG. 4 shows message exchanges, which enable the initiator device 202 and the responder device 204 to negotiate an agreement that enables the block transfer capability for communication between the devices.

Referring to FIG. 4, the initiator device 202 may initiate the attempt to negotiate the block transfer agreement by transmitting an add BlockAck (ADDBA) request frame 402 to the responder device 204. The ADDBA request frame 402 may comprise parameters that include block acknowledgement policy information, a traffic identifier (TID) value and a buffer size. The block acknowledgment policy information may enable the responder device 204 to send a delayed acknowledgment in response to a block transfer received from the initiator device 202 under the negotiated agreement. The TID value may identify frames subsequently transmitted under the block transfer agreement. The buffer size may indicate the number of frames, which may be transfers in a given block transfer operation. The responder device 204 may acknowledge receipt of the ADDBA request frame 402 by sending an ACK frame 404 to the initiator device 202.

The responder device 204 may respond to the ADDBA request frame 402 by sending an ADDBA response frame 406 to the initiator device 202. The ADDBA response frame 406 may comprise parameters, which indicate agreement with the parameter values sent in the ADDBA request frame 402, or the ADDBA response frame 406 may comprise one or more parameter values, which may differ from those in the ADDBA request frame 402. The initiator device 202 may acknowledge receipt of the ADDBA response frame 406 by sending an ACK frame 408. In various embodiments of the invention, the initiator device 202 and the responder device 204 may determine that an agreement for BTDA has been established at this point.

Figure 5A:
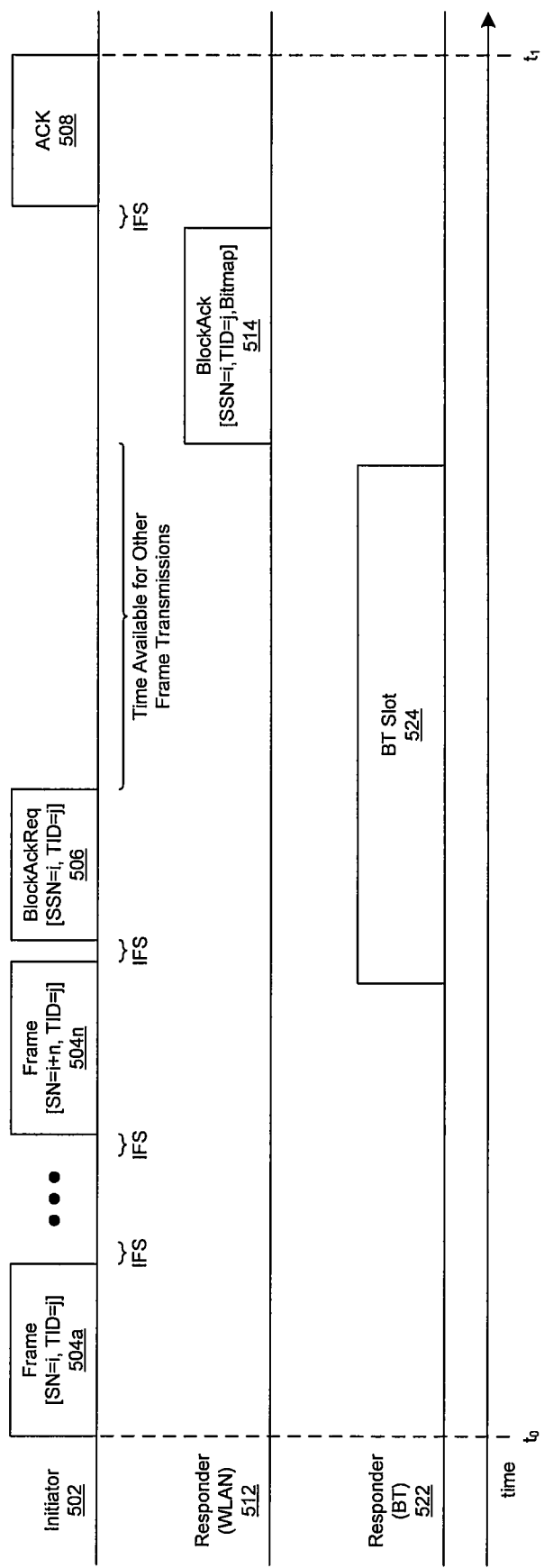
FIG. 5A is a diagram that presents illustrative exemplary frame message flows for BTDA, in accordance with an embodiment of the invention.

FIG. 5A is a diagram that presents illustrative exemplary frame message flows for BTDA, in accordance with an embodiment of the invention. Referring to FIG. 5A, there are shown frame transmissions by an initiator device 502 in a WLAN BSS, frame transmissions by a responder device 512 in the WLAN BSS and a BT slot for the responder device 522 in its role as a BT DEV in a piconet. The responder device 512 and the responder device 522 may be collocated in various embodiments of the invention. The frame transmissions and BT slot are shown across a range of time instants starting at a time instant $t_0$ and ending at a time instant $t_1$.

The initiator device 502 and the responder device 512 may negotiate an agreement to enable a BTDA capability as described in FIGS. 2 and 4. The negotiated agreement may establish parameter values, for example a TID value, which indicates frames that are transmitted in a block transfer. The initiator device 502 may transmit a plurality of sequence numbered frames 504a . . . 504n in a block transfer as permitted by the BTDA agreement. Each of the frames transmitted during the block transfer sequence may be identified by a distinct sequence number (SN) value. For example, the first frame in the block transfer, frame 504a, may be identified by SN=i, where i represents a numerical value. The SN value may be incremented for subsequent frames in the block transfer sequence. The last frame in the block transfer, frame 504n, may be identified by SN=i+n, where n represents a numerical value. Each of the frames transmitted in the block transfer sequence 504a . . . 504n may comprise an acknowledgment policy (AckPolicy) parameter value. Each frame in the frame sequence may comprise AckPolicy=BlockAck to indicate that each frame in the frame sequence 504a . . . 504n may be acknowledged in a BlockAck frame sent in response to a separately transmitted BlockAckReq frame.

The TID value may identify transmitted frames, which are associated with a given BTDA agreement between the initiator device 502 and the responder device 512. As shown in FIG. 5A, each of the frames in the block transfer sequence 504a . . . 504n are identified by TID=j, where j represents a numerical value that was established during the ADDBA request and ADDBA response message exchange sequence shown in FIG. 4. As shown in FIG 5A, each of the frames transmitted in the block transfer sequence 504a . . . 504n may be temporally separated by an interframe spacing (IFS) time duration. An IFS is a parameter that indicates a minimum time duration between the time instant that a STA completes transmission of a current frame and the time instant that the STA begins transmission of the next frame. An IFS may also indicate the minimum time duration between the time instant that a STA completes reception of a current frame and the time instant that the STA begins transmission of a frame. There may be various IFS types, for example a short IFS (SIFS), an extended IFS (EIFS), a point coordination function IFS (PIFS) or distributed coordination function IFS (DIFS), each of which may defined by a distinct time duration value. IFS parameter types and values, which may be utilized in various embodiments of the invention, may be specified in pertinent network communication specifications.

After transmitting frame 504n, the initiator device 502 may transmit a BlockAckReq frame 506 to the responder device 512. As shown in FIG. 5A, at the BlockAckReq frame 506 is transmitted across one or more time instants, which are coincident with a BT slot 524 at the responder device 522. Consequently, the responder device 512 may not send a BlockAck frame 514 in response to the BlockAckReq frame 506 until after the BT slot 524 time duration has ended. While the initiator device 502 waits to receive the BlockAck frame 514, the initiator device 502 may transmit frames to other STAs. After receiving the BlockAck frame 514, the initiator device 502 may transmit an ACK frame 508 to the responder device 512 to acknowledge receipt of the BlockAck frame 514.

The BlockAckReq frame 506 may comprise parameters, which may indicate state information at the initiator device 502, which may be related to the block transfer. For example, the BlockAckReq frame 506 may comprise a TID parameter value and a starting SN (SSN) parameter value. The TID parameter value identifies the block transfer sequence 504a . . . 504n. As shown in FIG. 5A, TID=j in the BlockAckReq frame 506. The SSN parameter value identifies the SN for the first frame, frame 504a, transmitted in the block transfer sequence. As shown in FIG. 5A, SSN=i in the BlockAckReq frame 506. The BlockAckReq frame 506 may comprise an AckPolicy parameter value. In an exemplary frame format, as set forth in IEEE 802.11 specifications, the AckPolicy parameter may be located within the QoS Control subfield, wherein the QoS Control subfield may be located within the MAC header field 322 (FIG. 3B). In various embodiments of the invention, the BlockAckReq frame 506 may comprise AckPolicy=NoAck, which indicates that the initiator device 502 does not expect the responder device 512 to immediately transmit a BlockAck frame 514 in response to receipt of the BlockAckReq frame 506.

The BlockAck frame 514 may comprise parameters, which indicate state information at the responder device 512, which is related to the block transfer. For example, the BlockAck frame 514 may comprise a TID parameter value, an SSN parameter value and a bitmap field. The TID parameter value in the BlockAck frame 514 may be determined based on the TID value in the received BlockAckReq frame 506. As shown in FIG. 5A, TID=j in the BlockAck frame 514. The SSN parameter value in the BlockAck frame 514 may be determined based on the SSN value in the received BlockAckReq frame 506. As shown in FIG. 5A, SSN=i in the BlockAck frame 514. The bitmap field within the BlockAck frame 514 may comprise a plurality of bits, wherein a distinct bit within the bitmap field corresponds to a distinct frame in the block transfer sequence 504a . . . 504n. The value of each bit indicates whether the responder device 512 has acknowledged receipt of the corresponding frame in the block transfer sequence.

In various embodiments of the invention, the initiator device 502 may transmit the BlockAckReq frame 506 prior to transmitting the first frame, frame 504a, in the block transfer sequence, or the initiator device 502 may transmit the BlockAckReq frame 506 after transmitting any frame in the block transfer sequence 504a . . . 504n.

Figure 5B:
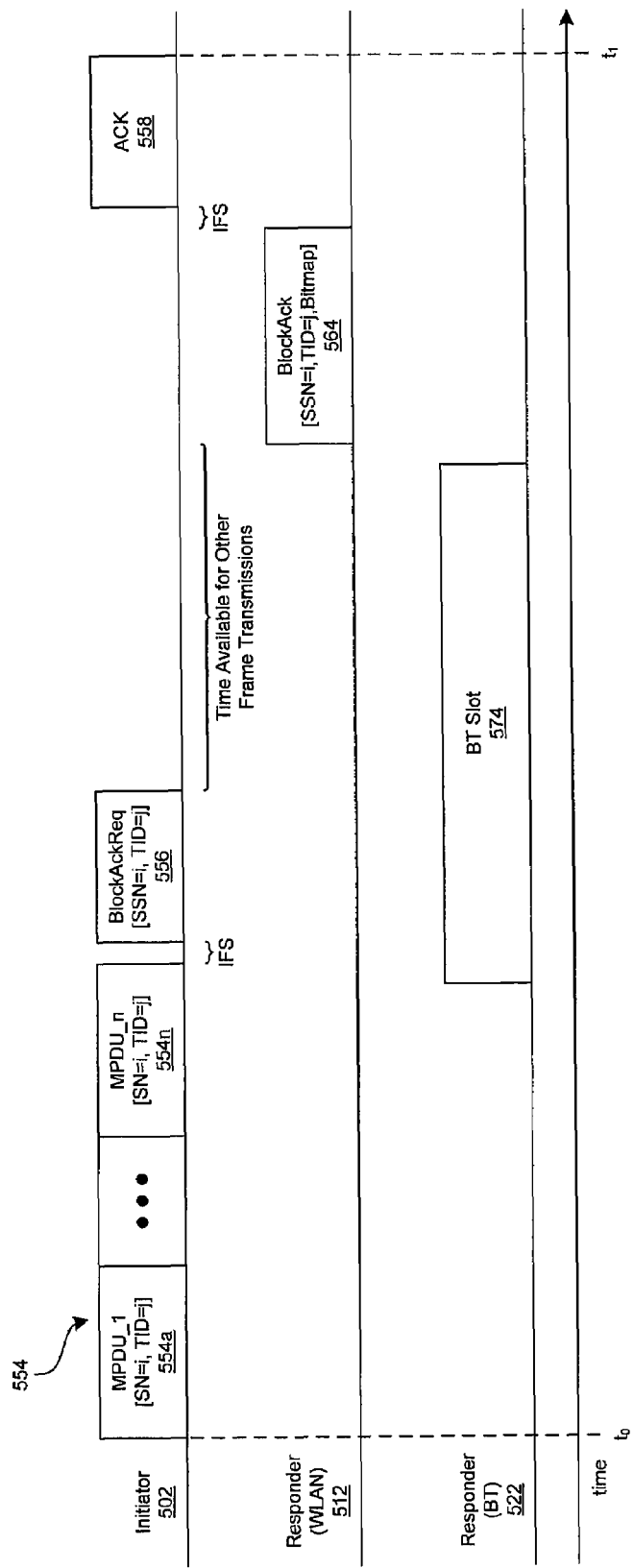
FIG. 5B is a diagram that presents illustrative exemplary frame message flows for BTDA with A-MPDU frame transmission, in accordance with an embodiment of the invention.

FIG. 5B is a diagram that presents illustrative exemplary frame message flows for BTDA with A-MPDU frame transmission, in accordance with an embodiment of the invention. Referring to FIG. 5B, there are shown frame transmissions by an initiator device 502 in a WLAN BSS, frame transmissions by a responder device 512 in the WLAN BSS and a BT slot for the responder device 522 in its role as a BT DEV in a piconet. The responder device 512 and the responder device 522 may be collocated in various embodiments of the invention. The frame transmissions and BT slot are shown across a range of time instants starting at a time instant $t_0$ and ending at a time instant $t_1$.

The initiator device 502 and the responder device 512 may negotiate an agreement to enable a BTDA capability as described in FIGS. 2 and 4. The negotiated agreement may establish parameter values, for example a TID value, which indicates frames that are transmitted in a block transfer. The initiator device 502 may transmit an aggregated MAC layer PDU (A-MPDU) 554. The A-MPDU 554 may be identified by the TID value and a sequence number (SN). As shown in FIG. 5B, the A-MPDU 554 is identified by SN=i, where i represents a numerical value. Also shown in FIG. 5B, the A-MPDU 554 is identified by TID=j, where j represents a numerical value that was established during the ADDBA request and ADDBA response message exchange sequence shown in FIG. 4. The A-MPDU 554 may comprise a plurality of A-MPDU subframes 554a . . . 554n. Each of the A-MPDU subframes may comprise a corresponding one of a plurality of MAC layer PDUs (MPDU_1, . . . , MPDU_n). The A-MPDU 554 may comprise an acknowledgment policy parameter value AckPolicy=NoAck, which indicates that the initiator device 502 does not expect the responder device 512 to transmit an ACK or BlockAck frame in response to receipt of the A-MPDU frame 554.

After transmitting the A-MPDU 554, the initiator device 502 may transmit a BlockAckReq frame 556 to the responder device 512. As shown in FIG. 5B, at the BlockAckReq frame 556 is transmitted across one or more time instants, which are coincident with a BT slot 574 at the responder device 522. Consequently, the responder device 512 may not send a BlockAck frame 564 in response to the BlockAckReq frame 556 until after the BT slot 574 time duration has ended. While the initiator device 502 waits to receive the BlockAck frame 564, the initiator device 502 may transmit frames to other STAs. After receiving the BlockAck frame 564, the initiator device 502 may transmit an ACK frame 558 to the responder device 512 to acknowledge receipt of the BlockAck frame 564. The BlockAckReq frame 556 may be substantially similar to the BlockAckReq frame 506 (FIG. 5A), the BlockAck frame 564 may be substantially similar to the BlockAck frame 514 and the ACK frame 556 may be substantially similar to the ACK frame 508 (FIG. 5A). In various embodiments of the invention, the initiator device 502 may transmit a BlockAckReq frame 556 prior to transmitting the A-MPDU 554.

Figure 6:
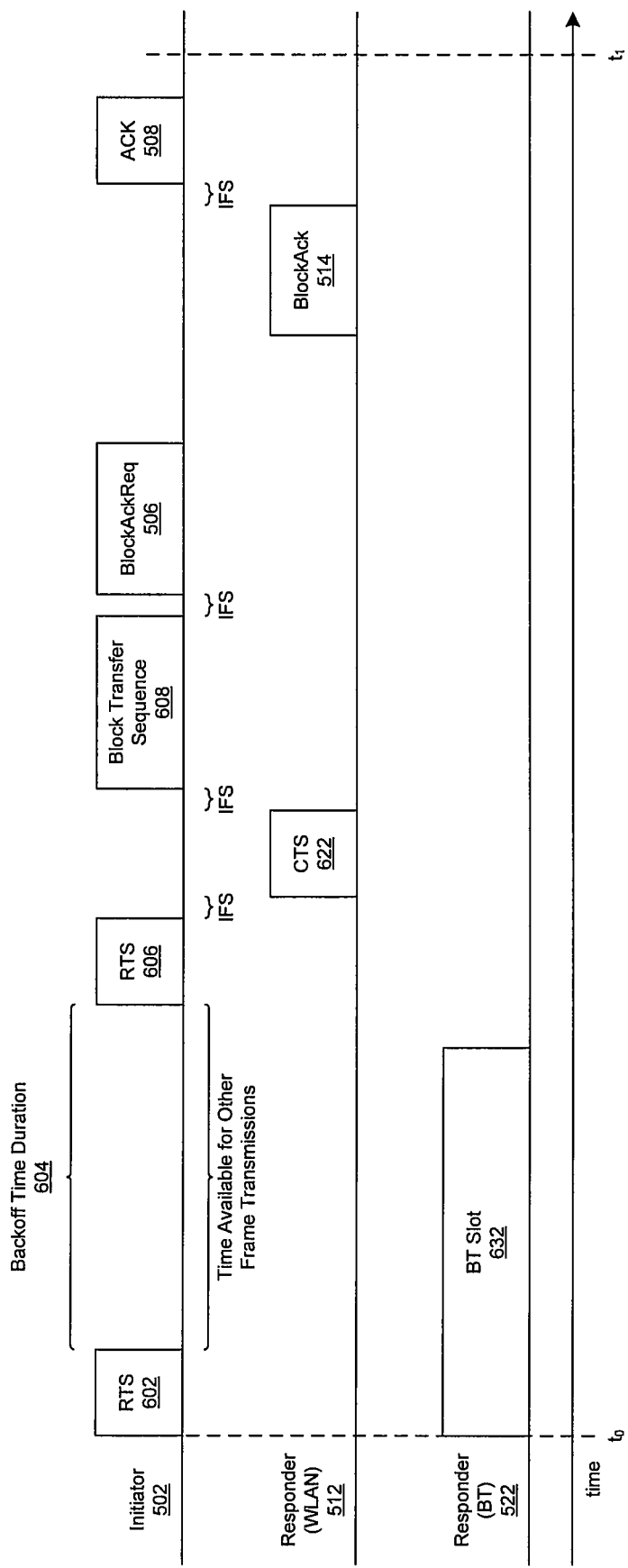
FIG. 6 is a diagram that presents an exemplary backoff procedure, in accordance with an embodiment of the invention.

FIG. 6 is a diagram that presents an exemplary backoff procedure, in accordance with an embodiment of the invention. Prior to transmitting the block transfer sequence 504a . . . 504n shown in FIG. 5A, an initiator device 502 and a responder device 512 may complete an exchange of messages to establish that the initiator device 502 may commence transmitting frames to the responder device 512. During the message exchange the initiator device 502 may send a request to send (RTS) frame to the responder device 512 and the responder device may respond by sending a clear to send (CTS) frame. In relation to FIG. 6, the block transfer sequence 504a . . . 504n may be represented by the A-MPDU 554, as shown in FIG. 5B.

Referring to FIG. 6, the initiator device 502 may indicate an intention to transmit one or more frames to the responder device 512 by sending an RTS frame 602 to the responder device 512. The responder device 512 may indicate a readiness to receive the frames from the initiator device 502 by transmitting a CTS frame to the initiator device 502. However, in instances when the time of transmission of the RTS frame 602 is coincident with a BT slot 632 at the responder device 522, the responder device 512 may not respond to the RTS frame prior to the end of the BT slot 632. As a result of the failure to receive a CTS frame in response to the transmitted RTS frame 602, the initiator device 502 may perform a backoff procedure. During execution of the backoff procedure, the initiator device 502 may determine a backoff time duration 604, which establishes a minimum time duration that will elapse before the initiator device 502 attempts to send a second RTS frame 606 to the responder device 512.

In conventional WLAN STAs, the backoff time duration 604, $t_{backoff}$, may comprise a fixed value, for example Distributed Control Function (DCF) IFS (DIFS) combined with a randomly selected value from a range of values from 0 time units (i.e. immediate retransmission after the STA ceases waiting to receive a CTS frame) to cw time units. The cw value ranges from cwmin to cwmax, depending on the number of unsuccessful transmission attempts performed since the last successful transmission. An exemplary value for the parameter cwmin may typically be equal to 15 time units, but in general the cwmin value may be determined based on parameters such as the access category assigned to the frame, on the control function performed by the initiator device 502 (for example distributed control function (DCF) or enhanced DCF (EDCF)), and/or on parameters established by the AP within the BSS to which the initiator device 502 is associated. The cwmax value is similarly determined, but is equal to or larger than the cwmin value.

In conventional WLAN STAs, the initiator device 502 may be operable to determine that a "collision" occurred during transmission of the RTS frame 602. A collision refers to a condition in which more than one STA within a given RF coverage area attempts to transmit frames via the wireless communication medium at the same time. In such case, the initiator device 502 may attempt to retransmit the RTS frame 602 at a randomly selected backoff time duration 604, wherein the cwmin value may be a relatively small value (e.g. 15 microseconds) to ensure that the backoff time duration 604 is relatively short.

When the initiator device 502 communicates with a responder device 512, which comprises dual WLAN STA and BT DEV capabilities, the likelihood that the responder device 512 will not respond to the transmitted RTS frame 602 (or "failure probability") may be influenced by various factors, for example, communication activity in the piconet with which the responder device 512 is associated may result in a failure of the responder device 512 to respond to the transmitted RTS frame 602. The timing, or time instants, during which the BT slot 632 occurs and/or the time duration of the BT slot 632, may influence the failure probability. Bit errors that occur during transmission of the RTS frame 602, which are uncorrectable at the responder device 512 or bit errors that occur during transmission of a responsive CTS frame, which are uncorrectable at the initiator device 502 may result in a failure of the responder device 512 to detect the transmitted RTS frame 602 or in a failure of the initiator device 502 to detect the responsive CTS frame. The bit errors may occur due to noise and/or interference, which may be encountered as the transmitted frame travel across the communication medium.

In various embodiments of the invention, the initiator device 502 may determine that a failure to receive a CTS frame has occurred based on analysis for various sources of failure. For example, the initiator device 502 may detect communication activity in the WLAN BSS by detecting signal energy from transmitted WLAN frames. The initiator device 502 may also detect reception of WLAN frames at time instants during which the initiator device 502 may expect to receive a response CTS frame by detecting the preamble field 312 and or PHY header field 314 in received WLAN frames for which one or more uncorrectable bit errors were detected based on the FCS field 326. The initiator device 502 may fail to detect reception of WLAN frames at time instants during which the initiator device 502 expects to receive a responsive CTS frame when no preamble field or PHY header field may be detected via the communication medium. The initiator device 502 may also identify the frequency associated with the RF channel at which the initiator device 502 expected to receive the responsive CTS frame.

In various embodiments of the invention, the initiator device 502 may determine that the responder device 512 comprises dual WLAN STA and BT DEV capabilities based on communication of vendor specific information between the responder device 512 and the initiator device 502 as shown in FIG. 2. In such case, the initiator device may determine that the failure to receive a CTS frame in response to the RTS frame 602 may indicate that the RTS frame 602 was transmitted at a time instant that was coincident with the BT slot 632 at the responder device 522.

Consequently, in various embodiments of the invention, the initiator device 502 may determine a minimum backoff time duration 604 as shown in the following equation:

$$t_{backoff} = RND(0, cwmin + f \cdot btwin) \quad [1]$$

where RND(x,y) represents a value randomly selected from a range of values, the minimum value of which is represented by x and the maximum value of which is represented by y. The variable f represents a probability of failure, where the value f may be selected from the range of values from zero (0) to one (1): f=[0,1]. The variable btwin represents the time duration of the BT slot 632 as measured in time units and the variable cwmin represents a minimum time duration for a contention window in a WLAN, where cwmin may also be measured in time units. For example, the time duration of a time unit may correspond to the time duration of a WLAN slot time. In an exemplary embodiment of the invention, the time duration of a WLAN slot time may be approximately equal to 9 microseconds. In an exemplary embodiment of the invention, btwin=625 microseconds and cwmin=135 microseconds.

In other exemplary embodiments of the invention, the initiator device 502 may determine a minimum backoff time duration 604 as shown in the following equation:

$$t_{backoff} = RND(0, cwmin) + f \cdot btwin \quad [2]$$

In various embodiments of the invention, the initiator device 502 may determine a value for the failure probability, f, based on the analysis of failure sources. In an exemplary embodiment of the invention, the initiator device 502 may select an initial failure probability value $f = f_{init} = \frac{1}{2}$. Based on the analysis of failure sources, the initiator device 502 may modify the failure probability value such that $f > f_{init}$ or $f < f_{init}$.

In conventional WLAN STAs, the initiator device 502, upon detecting a failure to receive a CTS frame in response to the transmitted RTS frame 602, may not attempt to transmit any frames until the end of the backoff time duration 604. In various embodiments of the invention, the initiator device 502 may determine that failure to receive the responsive CTS frame may not be due to collisions in the communication medium, but because of the RTS frame 602 may have been transmitted to the responder device 512 at a time instant that was coincident with the BT slot 632. In such case, the initiator device 502 may attempt to communicate with other STAs during the backoff time duration 604.

After the backoff time duration 604 has elapsed, the initiator device 502 may transmit a second RTS frame 606 to the responder device 512. If the responder device responds to the RTS frame 606 by sending a CTS frame 622 to the initiator device 502, the initiator device 502 may commence transmission of the block transfer sequence 608 to the responder device 512. The block transfer sequence 608 may be substantially similar to the block transfer sequence 504a . . . 504n shown in FIG. 5A. From this point, the communication between the initiator device 502 and the responder device 512 is substantially similar to the communication presented in FIG. 5A.

Figure 7:
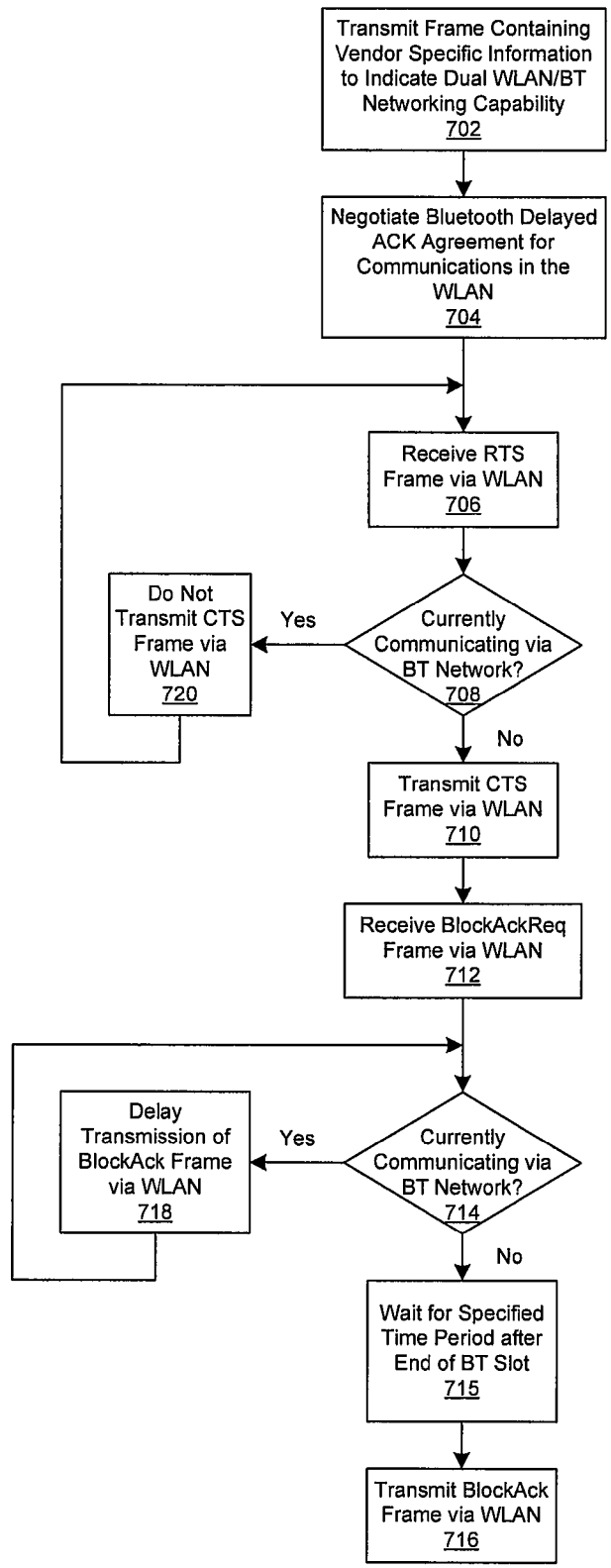
FIG. 7 is a flowchart that illustrates exemplary steps for BTDA at a responder device, in accordance with an embodiment of the invention.

FIG. 7 is a flowchart that illustrates exemplary steps for BTDA at a responder device, in accordance with an embodiment of the invention. Referring to FIG. 7, in step 702, a networking device with dual WLAN/BT networking capabilities may transmit a frame, for example a management action frame, that comprises vendor specific information. The vendor specific information may indicate that the networking device comprises dual WLAN/BT networking capabilities. For example, the Smartphone 114 shown in FIG. 1 is an exemplary dual capability networking device with WLAN STA capabilities that enables the Smartphone 114 to communicate in a WLAN BSS 102. The Smartphone 114 is an exemplary dual capability networking device, which may further comprise BT DEV capabilities that enable the Smartphone 114 to communicate in a BT piconet 132. The frame comprising the vendor specific information may be transmitted from a Smartphone 114, which may be associated with a BSS 102, to an AP 112, which serves the BSS 102. In step 704, the dual capability networking device may negotiate a BTDA agreement for communications in the WLAN. For example, AP 112 and Smartphone 114 may negotiate a BTDA agreement for communications between the AP 112 and the Smartphone within the BSS 102.

In step 706, the dual capability networking device may receive an RTS frame from an initiator device via the WLAN. For example, the AP 112 may send an RTS frame to the Smartphone 114 prior to initiating a block transfer of frames from the AP 112 to the Smartphone 114 within the BSS 102. In step 708, the dual capability networking device may determine whether there is active communication via the BT network. For example, the Smartphone 114 may determine whether the RTS frame has been received during a BT slot. In instances when the RTS frame has been received while the dual capability networking device is engaged in communication via the BT network, in step 720, the networking device may decline to interrupt communication via the BT network to transmit a CTS frame via the WLAN. In such case, the dual capability networking device may continue to engage in communication via the BT network. Step 706 may follow step 720.

In instances when the RTS frame has not been received while the dual capability networking device is not engaged in communication via the BT network, in step 710, the dual capability networking device may transmit a CTS frame to the initiator device via the WLAN. The initiator device may then proceed to transmit frames in a block transfer sequence to the dual capability networking device via the WLAN. In step 712, the dual capability networking device may receive a BlockAckReq frame from the initiator device. The BlockAckReq frame may be sent prior to transmission of any frames in the block transfer sequence or after any individual frame transmitted in the block transfer sequence. In instances when the BlockAckReq frame may be received while the dual capability networking device is engaged in communication via the BT network, in step 718, the networking device may decline to interrupt communication via the BT network and may delay transmission of a BlockAck frame to the initiator device. In instances when the BlockAckReq frame has been received while the dual capability networking device may not be engaged in communication via the BT network, in step 716, the dual capability networking device may transmit a BlockAck frame to the initiator device via the WLAN. In an exemplary embodiment of the invention, the BlockAck frame referred to in step 716 may be transmitted in accordance with relevant WLAN standards. Consequently, in various embodiments of the invention, at step 715, the dual capacity networking device may wait for a specified period of time subsequent to the end of a BT slot (such as BT slot 524 or BT slot 574 as shown in FIG. 5) before transmitting the BlockAck frame referred to in step 716.

Figure 8:
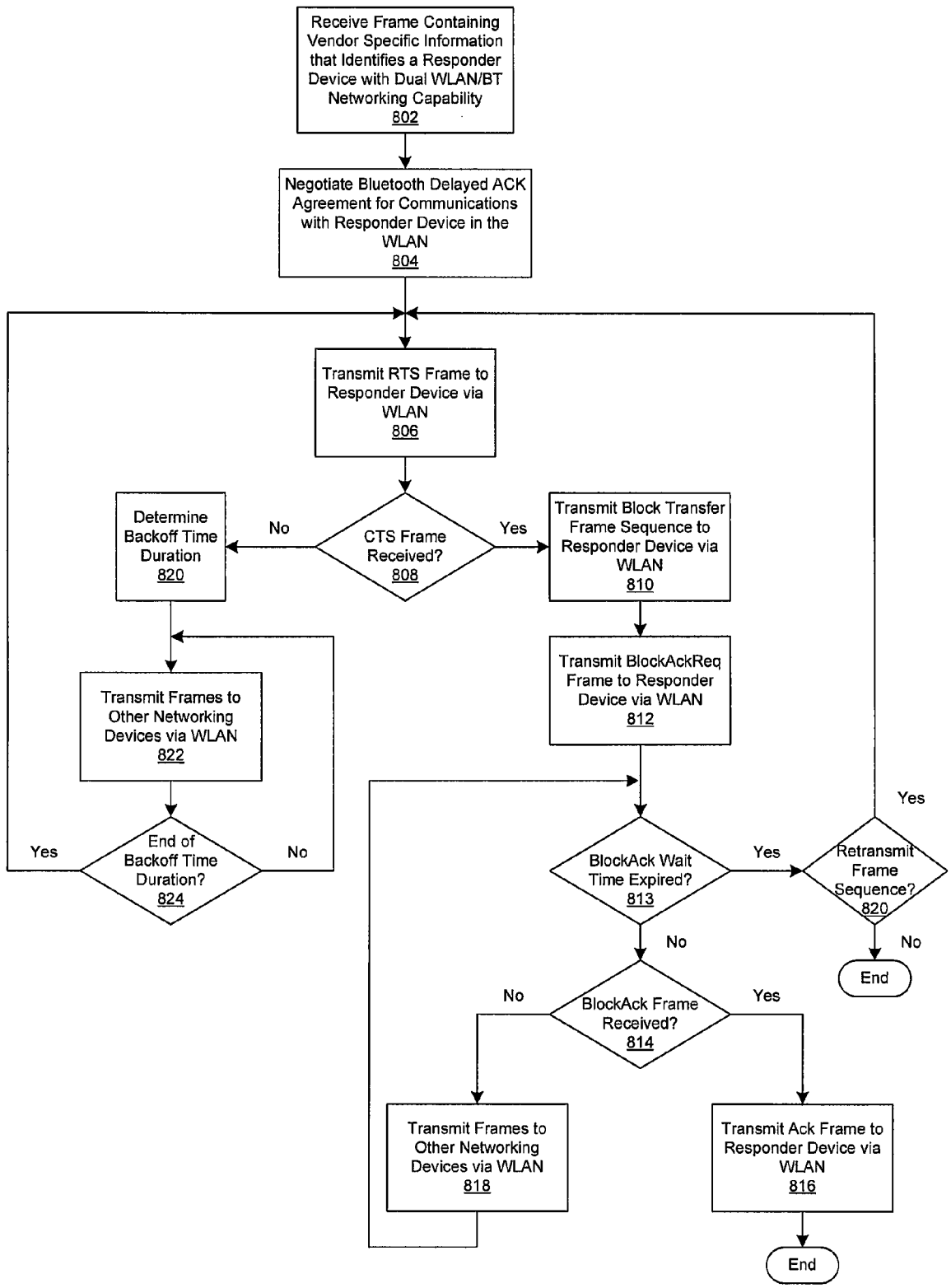
FIG. 8 is a flowchart that illustrates exemplary steps for BTDA at an initiator device, in accordance with an embodiment of the invention.

FIG. 8 is a flowchart that illustrates exemplary steps for BTDA at an initiator device, in accordance with an embodiment of the invention. Referring to FIG. 8, in step 802, a networking device may receive a frame, for example a management action frame, which comprises vendor specific information. The vendor specific information may indicate that a networking device, identified by the received frame, comprises dual WLAN/BT networking capabilities. For example, the AP 112 shown in FIG. 1 may receive a frame comprising vendor specific information from a Smartphone 114, which comprises dual networking capability. The received frame may identify the Smartphone 114 as the sender. In step 804, the recipient networking device may negotiate a BTDA agreement with the identified networking device for communications in the WLAN.

In step 806, the recipient networking device, acting as an initiator device, may transmit an RTS frame to the identified networking device, acting as a responder device, via the WLAN. For example, the AP 112, acting as an initiator device, may send an RTS frame to the Smartphone 114 prior to initiating a block transfer of frames from the AP 112 to the Smartphone 114 within the BSS 102. In step 808, the initiator device may determine whether a CTS frame has been received from the responder device via the WLAN. In instances when a CTS frame has been received from the responder device, in step 810, the initiator device may transmit a plurality of frames to the responder device via the WLAN in a block transfer sequence. In step 812, the initiator device may transmit a BlockAckReq frame to the responder device via the WLAN. In step 813, the initiator device may determine whether a BlockAck wait time interval has expired. The BlockAck wait time interval refers to a time duration for which the initiator device may await receipt of a BlockAck frame from the responder device. In various embodiments of the invention, the BlockAck wait time interval time duration may be determined based on the BT slot time duration and based the presence of communication activity detected in the WLAN. In instances when the BlockAck wait time interval has expired, in step 820, the initiator device may determine whether to retransmit the frame sequence. In instances when the initiator device determines that the frame sequence may be retransmitted, step 806 may follow step 820.

In instances when the BlockAck wait time interval has not expired at step 813, in step 814, the initiator device may determine whether a BlockAck frame has been received from the responder device via the WLAN. In instances when the BlockAck frame has been received, in step 816, the initiator device may transmit an ACK frame to the responder device to acknowledge receipt of the BlockAck frame.

In instances when the BlockAck frame has not been received at step 814, in step 818, the initiator device may wait to receive a delayed BlockAck frame from the responder device. During the waiting period, in step 818, the initiator device may transmit frames to other networking devices, for example WLAN STAs, via the WLAN. Step 813 may follow step 818.

In instances when a CTS frame has not been received at step 808, in step 820, the initiator device may determine a backoff time duration. The initiator device may wait until the end of the backoff time duration to transmit another RTS frame to the responder device. In step 822, the initiator device may transmit frames to other networking devices via the WLAN during the backoff time duration. In step 824, the initiator device may determine whether the backoff time duration has ended. In instances when the backoff time duration has not ended in step 824, step 822 may follow. In instances when the backoff time duration has ended in step 824, step 806 may follow.

Figure 9:
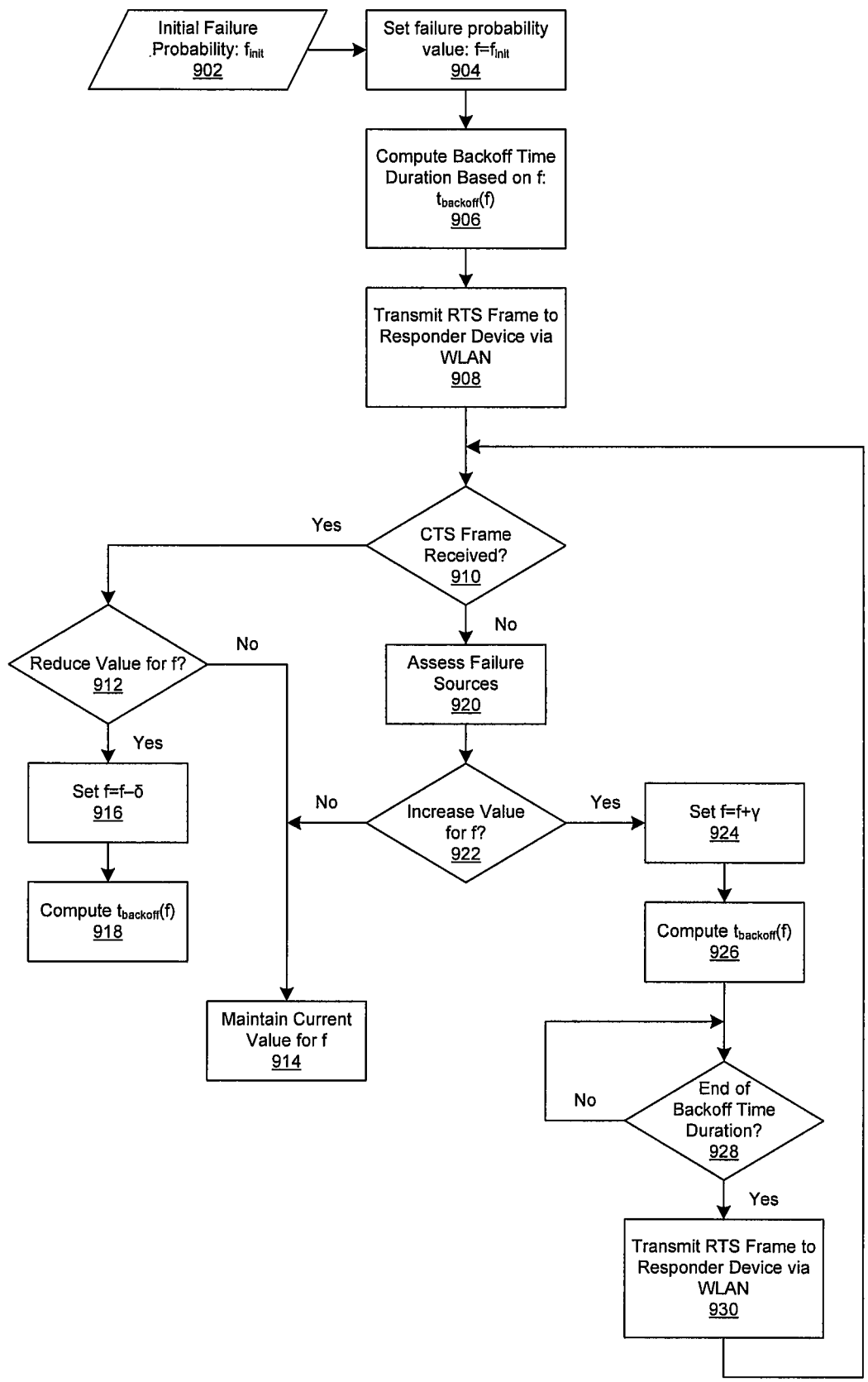
FIG. 9 is a flowchart that illustrates exemplary steps for backoff time duration determination, in accordance with an embodiment of the invention.

FIG. 9 is a flowchart that illustrates exemplary steps for backoff time duration determination, in accordance with an embodiment of the invention. Referring to FIG. 9, in step 902, an initiator device may be configured with an initial failure probability value, $f_{init}$. In step 904, the initiator device may set the probability of failure for frame transmission via the communication medium, f, to the initialization value $f_{init}$. In step 906, the initiator device may compute a backoff time duration as a function of f: $t_{backoff}(f)$. In step 908, the initiator device may transmit an RTS frame to a responder device, which comprises dual WLAN STA and BT DEV capability. In step 910, the initiator device may determine whether a CTS frame has been received from the responder device. In instances when the initiator device receives a CTS frame in step 910, in step 912, the initiator device may determine whether to reduce the failure probability value, f (reflecting an assessment that there may be a higher probability of successfully communicating with the responder device via the communication medium). In instances when the failure probability value is not to be reduced, in step 914, the initiator device may maintain the current value for f. In instances when the failure probability is to be reduced, in step 916, the initiator device may compute an updated value for the failure probability: $f=f-\delta$, where δ represents a decrement value. In step 918, the initiator device may recompute $t_{backoff}(f)$ based on the updated value f.

In instances when the initiator device does not receive a CTS frame in step 910, in step 920, the initiator device may assess sources, which may have contributed to the failure to receive the a CTS frame. In step 922, the initiator device may determine whether to increase the value f (reflecting an assessment that there may be a lower probability of successfully communicating with the responder device via the communication medium) based on the assessment performed in step 920. In instances when the failure probability value is not to be increased, step 914 may follow. In instances when the failure probability value is to be increased, in step 924, the initiator device may compute an updated value: f=f+γ, where γ represents an increment value. In step 926, the initiator device may recompute $t_{backoff}(f)$ based on the updated value f. In step 928, the initiator device may determine whether the backoff time duration has ended. The initiator device may remain in this state until the backoff time duration has ended. As illustrated in FIG. 8, in various embodiments of the invention, the initiator device may transmit frames to other networking devices via the WLAN while waiting for the backoff time duration to end. After the backoff time duration has ended, in step 930, the initiator device may transmit an RTS frame to the responder device via the WLAN. Step 910 may follow step 930.

Aspects of the system may comprise an initiator device, such as a WLAN access point (AP) 112, which enables transmission of a protocol data unit, such as a BlockAckReq frame, to a responder device, such as a Smartphone 114, via a first network, for example a WLAN BSS 102. The Smartphone 114 may be equipped with capabilities that enable communication via WLAN and Bluetooth networks. The AP 112 may wait to receive a response protocol data unit, such as a BlockAck frame, via the first network (WLAN) for a response time duration. The response time duration may be based on the communication slot time duration for communication by the Smartphone 114 on a second network, for example a BT piconet 132. The communication slot time duration may correspond to the time duration for a BT slot.

Another embodiment of the invention may provide a machine-readable storage, having stored thereon, a computer program having at least one code section executable by a machine, thereby causing the machine to perform the steps as described herein for Bluetooth (BT) delayed acknowledgment (ACK).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication with a wireless local area network having a coverage area with at least a portion collocated with another coverage area of a Bluetooth network, the method comprising:
   in a communication device:
   receiving at an initiator device a management action frame via said wireless local area network from a responder device, wherein the management action frame indicates that said responder device is able to communicate via said wireless local area network and is able to communicate via said Bluetooth network;
   transmitting, via said wireless local area network, a protocol data unit to a responder device;
   negotiating a delayed response time duration for acknowledgment communications in the wireless local area network, the negotiating a delayed response time including at least sending from the initiator device a request frame including at least a block acknowledgment policy to determine if the responder device can perform a delayed acknowledgment in response to a block transfer received from the initiator device, and the responder device returning at least a response frame with parameters including one or more of: block acknowledgement policy information, a traffic identifier (TID) value or a buffer size related to the request frame for the block acknowledgment policy;
   waiting the delayed response time duration after completion of said transmission of said protocol data unit to provide collocated wireless communication capability, wherein the delayed response time duration is greater than a communication slot time duration for communication by said responder device while on said Bluetooth network;
   receiving, via said wireless local area network, a response protocol data unit after said delayed response time duration; and
   transmitting, from the initiator device via said wireless local area network, an acknowledgment protocol data unit to said responder device in response to said received response protocol data unit.

2. The method according to claim 1, comprising transmitting said protocol data unit under one of the following conditions: subsequent to transmitting one or more data frames or prior to transmitting at least a portion of said one or more data frames.

3. The method according to claim 2, comprising transmitting said protocol data unit under one of the following conditions: subsequent to transmitting said one or more data frames or prior to transmitting at least a portion of said one or more data frames.

4. The method according to claim 3, wherein said transmitted protocol data unit is a block acknowledgment request frame comprising an acknowledgment policy of no acknowledgment that indicates that said responder device is not to transmit a block acknowledgment frame in response to receipt of said block acknowledgement request frame.

5. The method according to claim 1, comprising communicating with networking devices other than said responder device via said wireless local area network during said delayed response time duration.

6. The method according to claim 1, wherein the TID value identifies frames subsequently transferred under the block acknowledgment policy.

7. A system for wireless communication in at least a wireless local area network and a Bluetooth network having at least partially collocated coverage areas, the system comprising:
   one or more circuits that enable transmission of a protocol data unit from an initiator device to a responder device via said wireless local area network;
   one or more circuits that enable negotiating a delayed response time duration for acknowledgment communications in the wireless local area network, the negotiating a delayed response time duration including the initiator device sending a request frame including at least a block acknowledgment policy to determine if the responder device can perform a delayed acknowledgment in response to a block transfer received from the initiator device, and the responder device returning at least a response frame with parameters including one or more of: block acknowledgement policy information, a traffic identifier (TID) value or a buffer size related to the request frame for the block acknowledgment policy;
   said one or more circuits that wait the delayed response time duration after completion of said transmission of said protocol data unit to provide collocated wireless communication, wherein the delayed response time duration is greater than a communication slot time duration for communication by said responder device on said Bluetooth network;
   said one or more circuits enable reception of a response protocol data unit via said wireless local area network after said delayed response time duration; and
   said one or more circuits provide transmission of an acknowledgment protocol data unit by the initiator device to said responder device via said wireless local area network in response to said response protocol data unit.

8. The system according to claim 7, wherein said one or more circuits enable reception of a management action frame via said wireless local area network from said responder device before said transmission of said protocol data unit, which indicates that said responder device is able to communicate via said wireless local area network and is able to communicate via said Bluetooth network.

9. The system according to claim 8, wherein said one or more circuits enable transmission of said protocol data unit under one of the following conditions: subsequent to transmission of one or more data frames or prior to transmission of at least a portion of said one or more data frames.

10. The system according to claim 9, wherein said transmitted protocol data unit is a block acknowledgment request frame comprising an acknowledgment policy of no acknowledgment that indicates that said responder device is not to transmit a block acknowledgment frame in response to receipt of said block acknowledgement request frame.

11. The system according to claim 7, wherein said one or more circuits enable communication with networking devices other than said responder device via said wireless local area network during said delayed response time duration.

12. The system according to claim 7, wherein the TID value identifies frames subsequently transferred under the block acknowledgment policy.

13. A method for wireless communication with a wireless local area network and a Bluetooth network having coverage areas at least partially collocated to one another, the method comprising:
   in a communication device with dual network communication capability, the dual network including at least the wireless local area network and the Bluetooth network:
   transmitting from an initiator device a protocol data unit to a responder device via said wireless local area network;
   determining whether a failure to receive a response protocol data unit is based on communication by said responder device on said Bluetooth network;
   determining, based on communication by said responder device on said Bluetooth network a block acknowledgment policy to determine if the responder device can perform a delayed acknowledgment in response to a block transfer received from the initiator device, and the responder device returning at least a response frame with parameters including at least a backoff time duration when said response protocol data unit is not received, wherein said determined backoff time duration includes a time period to wait before transmission of a subsequent protocol data unit to said responder device via said wireless local area network and is greater than a communication slot time duration for communication by said responder device on said Bluetooth network; and
   transmitting from the initiator device one or more data frames to said responder device via said wireless local area network after said response protocol data unit is received in response to said transmitted subsequent protocol data unit.

14. The method according to claim 13, comprising receiving a management action frame via said wireless local area network from said responder device before said transmission of said protocol data unit, which indicates that said responder device is able to communicate via said wireless local area network and is able to communicate via said Bluetooth network.

15. The method according to claim 13, wherein said response protocol data unit is a clear to send frame.

16. The method according to claim 13, comprising transmitting said protocol data unit to said responder device subsequent to an end of said waiting said backoff time duration.

* * * * *